United States Patent [19]

Traczek

[11] Patent Number: 5,097,910
[45] Date of Patent: Mar. 24, 1992

[54] WEED CUTTING TOOL

[76] Inventor: Edward F. Traczek, 312 W. Meandering Way, Red Oak, Tex. 75154

[21] Appl. No.: 685,887
[22] Filed: Apr. 16, 1991
[51] Int. Cl.⁵ .................................................. A01B 1/12
[52] U.S. Cl. ..................................... 172/375; 172/378; 172/381
[58] Field of Search ............... 172/375, 371, 372, 378, 172/381, 380, 753, 719, 772.5; 56/239, 400.05, 400.06

[56] References Cited

U.S. PATENT DOCUMENTS

| | | | |
|---|---|---|---|
| 1,110,244 | 9/1914 | Vale | 172/372 |
| 1,279,704 | 9/1918 | Jones | 172/371 |
| 1,685,217 | 9/1928 | Guthrie | 172/380 |
| 1,780,741 | 11/1930 | Cadwallader | 172/375 |
| 2,040,751 | 5/1936 | Marseilles | 172/380 |
| 2,169,557 | 8/1939 | Curtiss | 172/375 |
| 2,251,048 | 7/1941 | Garland | 172/372 |
| 2,771,019 | 11/1956 | Zeitz | 172/375 |
| 2,787,204 | 4/1957 | Leckenby | 172/375 |
| 3,319,722 | 5/1967 | Marron | 172/719 |
| 3,545,551 | 12/1970 | Niemeyer | 172/371 |
| 3,739,562 | 6/1973 | McNamara | 172/375 |
| 3,942,591 | 3/1976 | Brannin | 172/375 |
| 3,965,990 | 6/1976 | Pittman | 172/386 |
| 4,014,391 | 3/1977 | McWhirter | 172/13 |
| 4,110,921 | 9/1978 | Poker, Jr. | 172/719 |
| 4,790,388 | 12/1988 | Badham | 172/375 |

FOREIGN PATENT DOCUMENTS 927091  5/1963  United Kingdom ................ 172/380

Primary Examiner—Randolph A. Reese
Assistant Examiner—Spencer Warnick
Attorney, Agent, or Firm—Leon Gilden

[57] ABSTRACT

A weed cutting tool including an elongate handle mounting a generally "L" shaped leg at a lower end thereof for securement to a blade member. The blade member includes arcuate forward and rear cutting edges, with spaced parallel sides, each side including a cutting notch therewithin. Modifications of the invention include mounted forward and rear cutting blades, with the forward blade including saw tooth projections, and the rear blade including spaced notched members with intercommunicating cutting edges, with a handle including a cavity formed within the handle for securing gloves and the like therewithin.

2 Claims, 5 Drawing Sheets

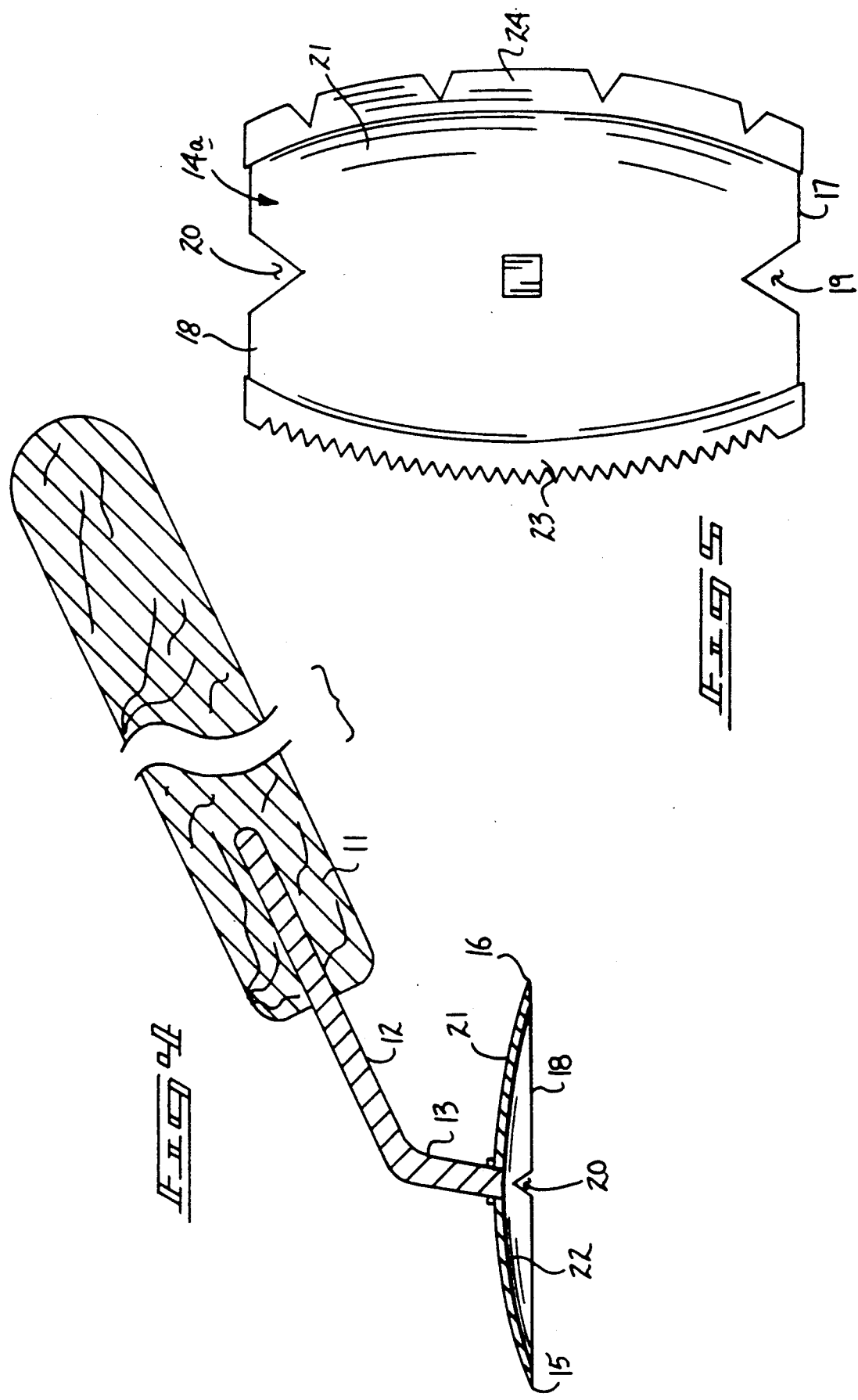

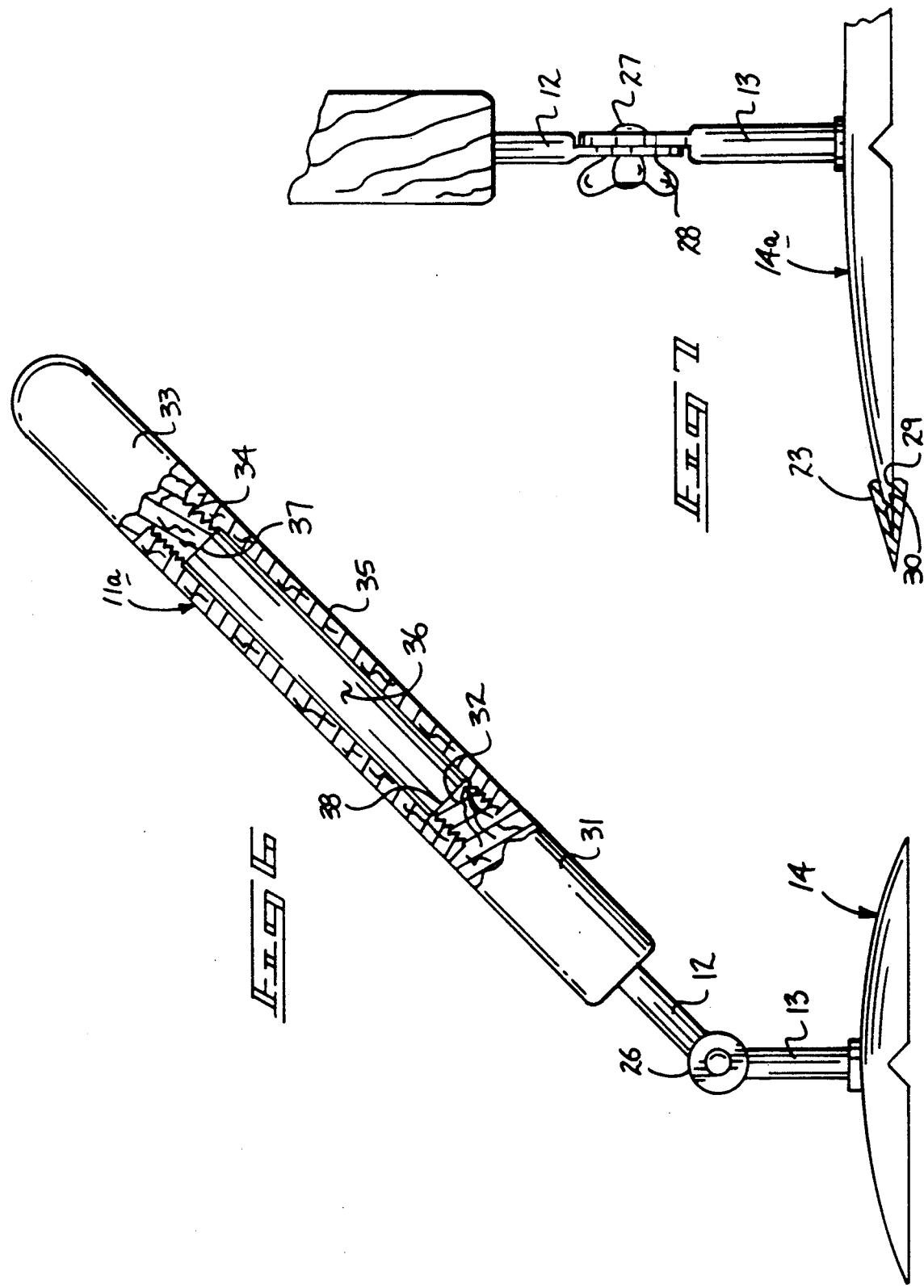

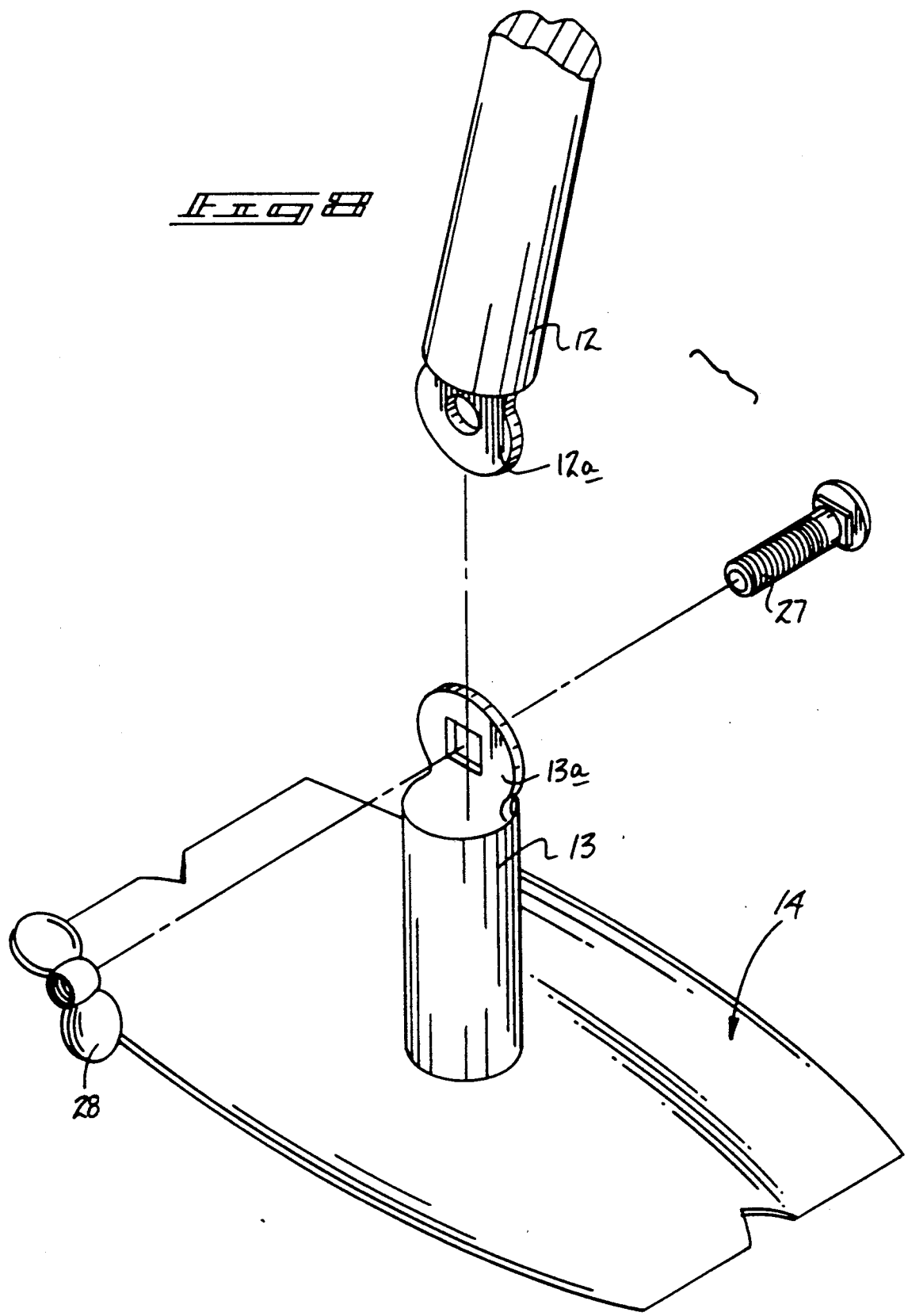

5,097,910

WEED CUTTING TOOL

BACKGROUND OF THE INVENTION

1. Field of the Invention

The field of invention relates to agricultural implements, and more particularly pertains to a new and improved weed cutting tool wherein the same is arranged for efficient and effective cutting and trimming of weeds adjacent desired vegetation.

2. Description of the Prior Art

Various weeding and cutting implements have been utilized in the prior art for use in agricultural environments. Such prior art may be found for example in U.S. Pat. No. 4,790,388 to Badhan wherein a cultivation tool includes a plate member with peripheral sharpened edges and rearwardly directed notches.

U.S. Pat. No. 2,040,751 to Marseilles sets forth a cultivator formed with hook shaped projections directed through one side and a pointed edge adjacent an opposed side.

U.S. Pat. No. 4,014,391 to McWhirter sets forth a tool that combines a digging, trimming, and edging organization formed to an arcuate blade.

U.S. Pat. No. 3,965,990 to Pittman sets forth a guard implement formed with a sequentially configured cutting blade for deweeding and raking.

U.S. Pat. No. 3,942,591 to Brannin sets forth an agricultural implement of a generally rectangular configuration formed with planar side cutting edges.

As such, it may be appreciated that there continues to be a need for a new and improved weed cutting tool as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of agricultural tools now present in the prior art, the present invention provides a weed cutting tool wherein the same is arranged for ease of access to and efficiency in the trimming and cutting of weeds in surrounding agricultural environments relative to an individual. As such, the general purpose of the present invention, which will be described subsequently in greater detail, is to provide a new and improved weed cutting tool which has all the advantages of the prior art agricultural tools and none of the disadvantages.

To attain this, the present invention provides a weed cutting tool including an elongate handle mounting a generally "L" shaped leg at a lower end thereof for securement to a blade member. The blade member includes arcuate forward and rear cutting edges, with spaced parallel sides, each side including a cutting notch therewithin. Modifications of the invention include mounted forward and rear cutting blades, with the forward blade including saw tooth projections, and the rear blade including spaced notched members with intercommunicating cutting edges, with a handle including a cavity formed within the handle for securing gloves and the like therewithin.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily by utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal time or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved weed cutting tool which has all the advantages of the prior art agricultural tools and none of the disadvantages.

It is another object of the present invention to provide a new and improved weed cutting tool which may be easily and efficiently manufactured and marketed.

It is a further object of the present invention to provide a new and improved weed cutting tool which is of a durable and reliable construction.

An even further object of the present invention is to provide a new and improved weed cutting tool which is susceptible of a low cost of manufacture with regard to both materials and labor, and which accordingly is then susceptible of low prices, of sale to the consuming public, thereby making such weed cutting tools economically available to the buying public.

Still yet another object of the present invention is to provide a new and improved weed cutting tool which provides in the apparatuses and methods of the prior art some of the advantages thereof, while simultaneously overcoming some of the disadvantages normally associated therewith.

Still another object of the present invention is to provide a new and improved weed cutting tool wherein the same is arranged for manual manipulation relative to weeds for their trimming and removal.

These together with other objects of the invention, along with the various features of novelty which characterize the invention, are pointed out with particularly in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is an orthographic view, taken along the lines 4—4 of FIG. 3 in the direction indicated by the arrows.

FIG. 5 is an orthographic bottom view of a modification of the blade of the instant invention.

FIG. 6 is an orthographic side view, partially in section, of a modified handle structure utilized by the instant invention in association with a pivotal mount relative to the blade.

FIG. 7 is an orthographic side view of a modified blade structure utilized by the instant invention.

FIG. 8 is an isometric exploded view of the pivotal connection utilized by the instant invention relative to the blade.

DESCRIPTION OF THE PREFERRED EMBODIMENT

Figure 1:
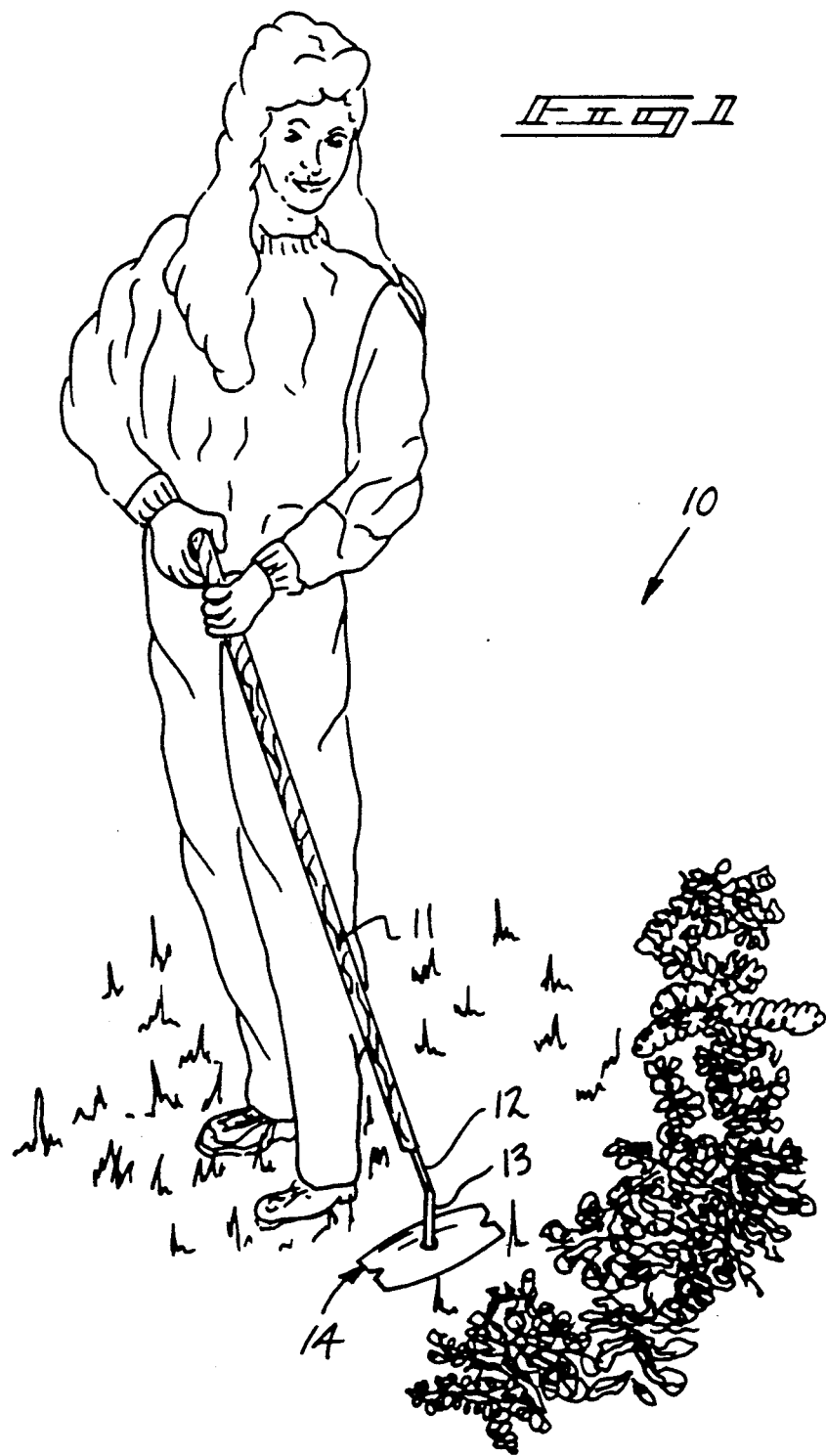
FIG. 1 is an isometric illustration of the instant invention in use.
Figure 2:
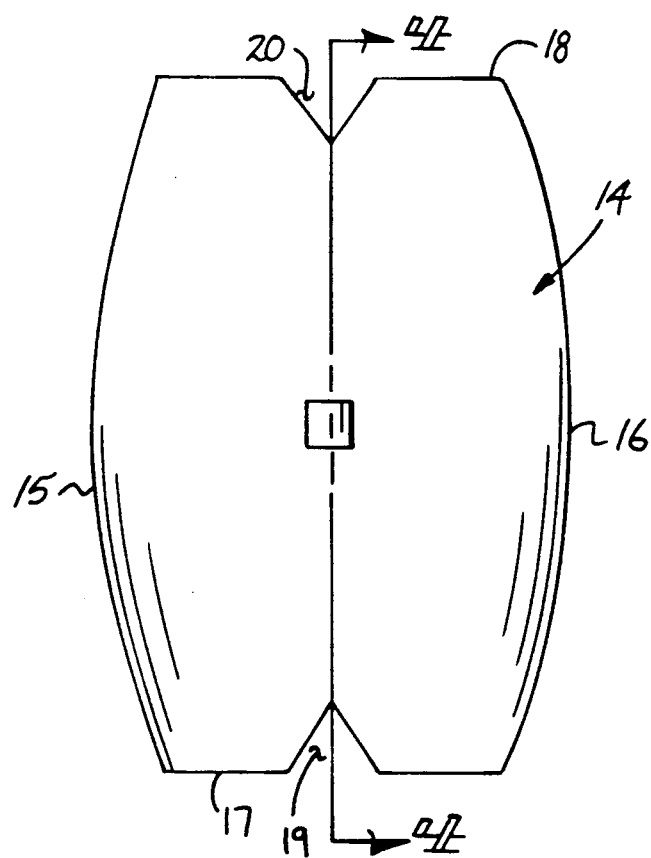
FIG. 2 is an orthographic bottom view of the instant invention.
Figure 3:
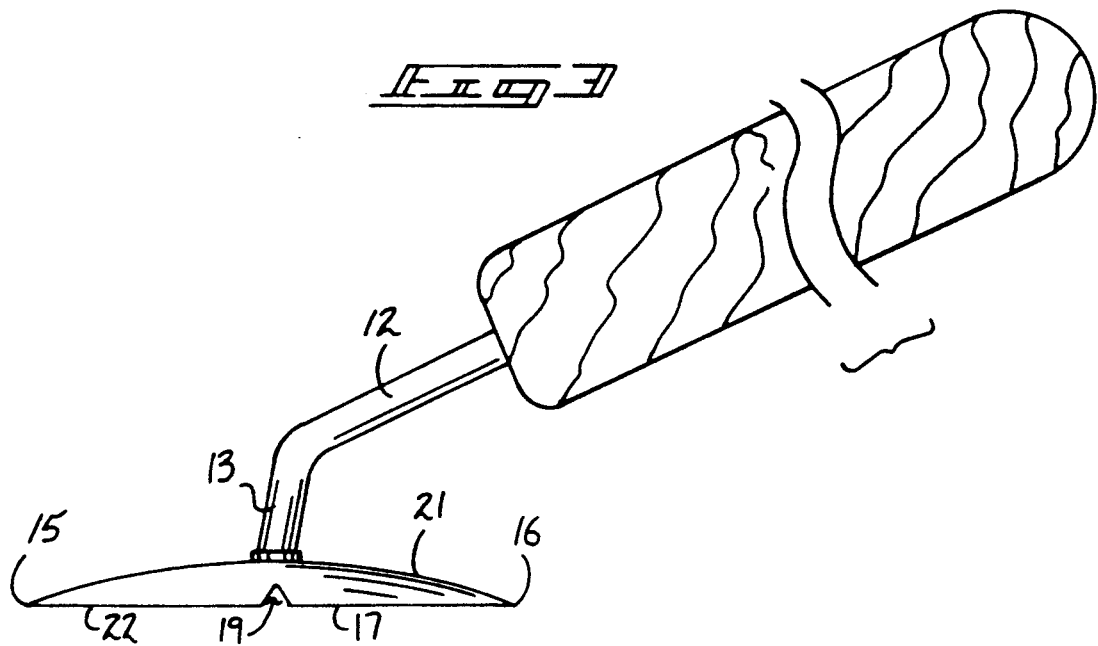
FIG. 3 is an orthographic side view, taken in elevation, of the instant invention.

With reference now to the drawings, and in particular to FIGS. 1 to 8 thereof, a new and improved weed cutting tool embodying the principles and concepts of the present invention and generally designated by the reference numeral 10 will be described.

More specifically, the weed cutting tool 10 of the instant invention essentially comprises an elongate longitudinally aligned handle 11, with a first handle extension link 12 mounted longitudinally aligned with the handle 11 at a lower terminal end of the handle, with the first extension link 12 fixedly mounted to a second extension link 13 defining an obtuse angle therebetween. The second extension link 13 mounts a blade member 14 orthogonally through a lower terminal end of the second link 13. The blade member 14 is defined by an arcuate convex forward blade edge and an arcuate convex rear blade edge, with a first side and second side 17 and 18 respectively arranged parallel to one another. The parallel first and second sides 17 and 18 include a respective first and second side cutting notch 19 and 20 positioned medially of each of the first and second sides 17 and 18. The blade 14 is further formed in a convex top surface 21 and a convex bottom surface 22 to provide strength and rigidity to the organization in use.

FIG. 5 illustrates the use of a modified blade member 14a, wherein a saw tooth forward blade insert 23 and a notched rear blade insert 24 are mounted to the respective forward and rear blade edges 15 and 16 utilizing opposed clamping projections 30 mounted interiorly of a "V" shaped interior cavity 29 of each of the blade inserts. The forward blade insert 23 includes saw toothed teeth for enhanced cutting of relative thin weed type structure, whereas the rear blade insert 24 includes an arcuate blade defined by spaced notches, wherein the arcuate blade is of an arcuate lineal length to provide for a greater severing action.

FIGS. 6 and 8 illustrate the use of a pivot connection 26 utilizing pivot axle 27 and a clamp 28 to permit selective pivotment of the first and second extension links 12 and 13 relative to one another to modify angulation between the extension links for comfort and convenience of an individual. The first extension link 12 thereby utilizes a planar first extension link ear 12a, wherein the second extension link 13 utilizes a planar second leg ear 13a to receive orthogonally the axle 27 therethrough permitting clamping by the clamp 28 to effect selective alignment of the extension links as desired.

FIG. 6 illustrates that the organization utilizes a modified handle 11a, including a lower handle section 31 and an upper handle section 33, wherein the upper handle section 33 includes an upper threaded boss 34, whereas the lower handle section 31 includes a lower threaded boss 32, wherein each threaded boss is threadedly receivable within a respective internally threaded upper end 37 and an internally threaded lower end 38 formed to opposed ends of a central tubular handle section 35 defining a cylindrical storage cavity 36 therewithin to permit securement of various components, such as gloves and the like for use by an individual.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A weed cutting tool comprising,
   an elongate longitudinally aligned handle, the handle including a handle lower terminal end, with a first handle extension link longitudinally aligned with the handle mounted to the lower terminal end, and
   a second extension link mounted to the first extension link defining an oblique angle therebetween, and
   a blade member mounted to the second extension link remote from the first extension link, the blade member including a convex arcuate forward blade edge spaced from a rearwardly extending convex arcuate rear blade edge, and
   the blade member including a first side spaced from and parallel a second side, with the first and second sides extending between the forward and rear blade edges, and
   a first side cutting notch mounted medially within the first side, and a second side cutting notch mounted medially within the second side, and the blade member defined by a convex top surface coextensive with a concave bottom surface to impart strength and rigidity to the blade member in use, and
   wherein the forward blade edge includes a mounted saw toothed forward blade insert, and the rear blade edge includes a rear blade insert, wherein the rear blade insert includes a series of spaced notches with arcuate elongate blade members directed therebetween, and the forward and rear blade inserts each are defined by a "V" shaped interior cavity, and each "V" shaped interior cavity includes opposed clamping projections for securement of each blade insert to the blade member.

2. An apparatus as set forth in claim 1 wherein the first extension link includes a first link lower end and the second extension link includes a second link upper end, wherein the first link lower end includes a planar first extension leg ear, and the second extension link includes a planar second leg ear fixedly mounted to the second link upper end, and an axle member orthogonally directed through the first extension leg ear and the second extension leg ear, and a clamp member is mounted to the axle for selective angulated locking of the first extension link relative to the second extension link.

* * * * *